United States Patent [19]

Erving et al.

[11] Patent Number: 5,426,460

[45] Date of Patent: Jun. 20, 1995

[54] VIRTUAL MULTIMEDIA SERVICE FOR MASS MARKET CONNECTIVITY

[75] Inventors: Richard H. Erving, Piscataway; Irwin Gerszberg, Kendall Park; Daniel Rosen, Chatham Township, Morris County; Robert E. Schroeder, Township of Morris, Morris County, all of N.J.

[73] Assignee: AT&T Corp., Murray Hill, N.J.

[21] Appl. No.: 169,562

[22] Filed: Dec. 17, 1993

[51] Int. Cl.$^6$ .............................................. H04N 7/14
[52] U.S. Cl. ..................................... 348/14; 348/17; 395/2.79; 381/48
[58] Field of Search ........................ 348/14, 15, 16, 17, 348/18, 19; 379/53, 54; H04N 7/15, 7, 14; 395/2.71, 2.84, 2.79; 381/36, 42, 48, 51

[56] References Cited

U.S. PATENT DOCUMENTS

| | | | |
|---|---|---|---|
| 4,104,625 | 8/1978 | Bristow et al. | 381/48 |
| 4,520,501 | 5/1985 | DuBruca | 395/2.8 |
| 4,841,575 | 6/1989 | Welsh et al. | 381/36 |
| 5,313,522 | 5/1994 | Slager | 381/48 |

FOREIGN PATENT DOCUMENTS

| | | | |
|---|---|---|---|
| 274962 | 11/1987 | Japan | 379/53 |
| 209836 | 6/1988 | Japan | 379/53 |
| 303990 | 12/1989 | Japan | H04N 7/14 |
| 36687 | 2/1990 | Japan | H04N 7/14 |
| 196585 | 8/1990 | Japan | H04N 7/14 |
| 5014550 | 1/1993 | Japan | 379/53 |
| 5153581 | 6/1993 | Japan | H04N 7/14 |

Primary Examiner—James J. Groody
Assistant Examiner—Chris Grant
Attorney, Agent, or Firm—Alfred G. Steinmetz

[57] ABSTRACT

A new communication system merges a voice communication with an image communication into a single transmission channel to provide a virtual voice/video communication service over a limited channel bandwidth. A voice communication path is established between two subscriber communication stations and a desired still picture image is transmitted via the voice channel at the start of the transmission. Portions of the still image expected to be visually active during the communication, such as facial movements (e.g. the lips of the speaker), are replaced at the receiver by an idealized representative image. The voice portion of the transmission is digitally encoded and transmitted from the transmitting station to the receiving station. Synchronous activation of the idealized image (e.g. the lips) are animated by code book coefficients of the digitized speech message.

5 Claims, 8 Drawing Sheets

VIRTUAL MULTIMEDIA SERVICE FOR MASS MARKET CONNECTIVITY

FIELD OF THE INVENTION

This invention relates to wireless communication systems and in particular to systems for providing both voice and imaging communications.

BACKGROUND OF THE INVENTION

Combining voice and video communication is a desirable service now just being offered over land telecommunication lines. The video portion of the communication requires a considerably wider bandwidth than the voice communication. Accordingly the video portion of the signal may be transmitted over the voice transmission channel which conventionally has a relatively narrow bandwidth compared with the bandwidth requirements of the video signal. This results in significant degradation of the video portion of the communication.

With the increasing scope of wireless communication services offend, combined video services are a very desirable enhancement to be offered the wireless subscriber. A limitation in offering such service is the disparate bandwidth requirements of the voice and video communication signal. This may be remedied in a wireless system by the use of separate voice and video communication channels. The use of separate channels is undesirable for many reasons including multi-pathing differences of the separate wireless transmissions and the accompanying difficulties of synchronizing the two channels as well as the overall bandwidth requirements.

Expansion of the bandwidth of a vocal channel to accommodate real time image transmissions over a voice channel in both land-line and wireless systems is not economically feasible both in terms of capital expense and operating expense.

SUMMARY OF THE INVENTION

A new communication system merges a voice communication with an accompanying image communication into a sequence of signals transmitted over a single voice transmission channel to provide a virtual voice/video communication service over the limited channel bandwidth of the voice channel. A voice communication path is established between two subscriber communication stations and a desired still picture image is recorded at the transmitter and transmitted to the receiver, via the voice channel, at the start of the transmission. Portions of the still image expected to be visually active during the communication, such as facial movements (e.g. the lips of the speaker), are replaced at the receiver by an idealized representative image. The voice portion of the transmission is digitally encoded and transmitted from the transmitting station to the receiving station. Synchronous activation of the idealized image (e.g. the lips) are animated in response to the book coefficients of the digitized speech message.

An alternative to this arrangement is to transmit analog voice signals and to digitally encode the speech at the receiver to generate the necessary speech coefficients for animating the idealized image.

The desired image may be captured at the transmitting station by a CCD camera in combination with encoding processing equipment. The update rate of the idealized image is determined by the bandwidth of the communication channel.

In a particular illustrative digital voice radio transmission embodiment, the image is transmitted at a time coincident or prior to the establishment of the voice channel. The initial transmission includes a start of a voice message and a representative still image of the face of the caller. Portions of the face that are expected to have continuous changes such as the caller's lips are replaced, at the receiver, by an idealized animated lip image which is animated in real time to reflect the lip motion of the caller.

In a particular implementation of the invention, formants are extracted from the vocal tract frequency responses of a particular vocal tract model responsive to a received voice signal over a telecommunication channel. The formants are associated with phonics using maximum likelihood techniques. The phonic information is then converted into lip motion in the idealized lip image.

In a particular embodiment a representative still image of a caller is transmitted over a voice channel at the creation of a call. Selected facial movements of that image are continuously updated for the duration of the call by deriving information from a voice coded signal transmitting the voice message.

DETAILED DESCRIPTION

Figure 1:
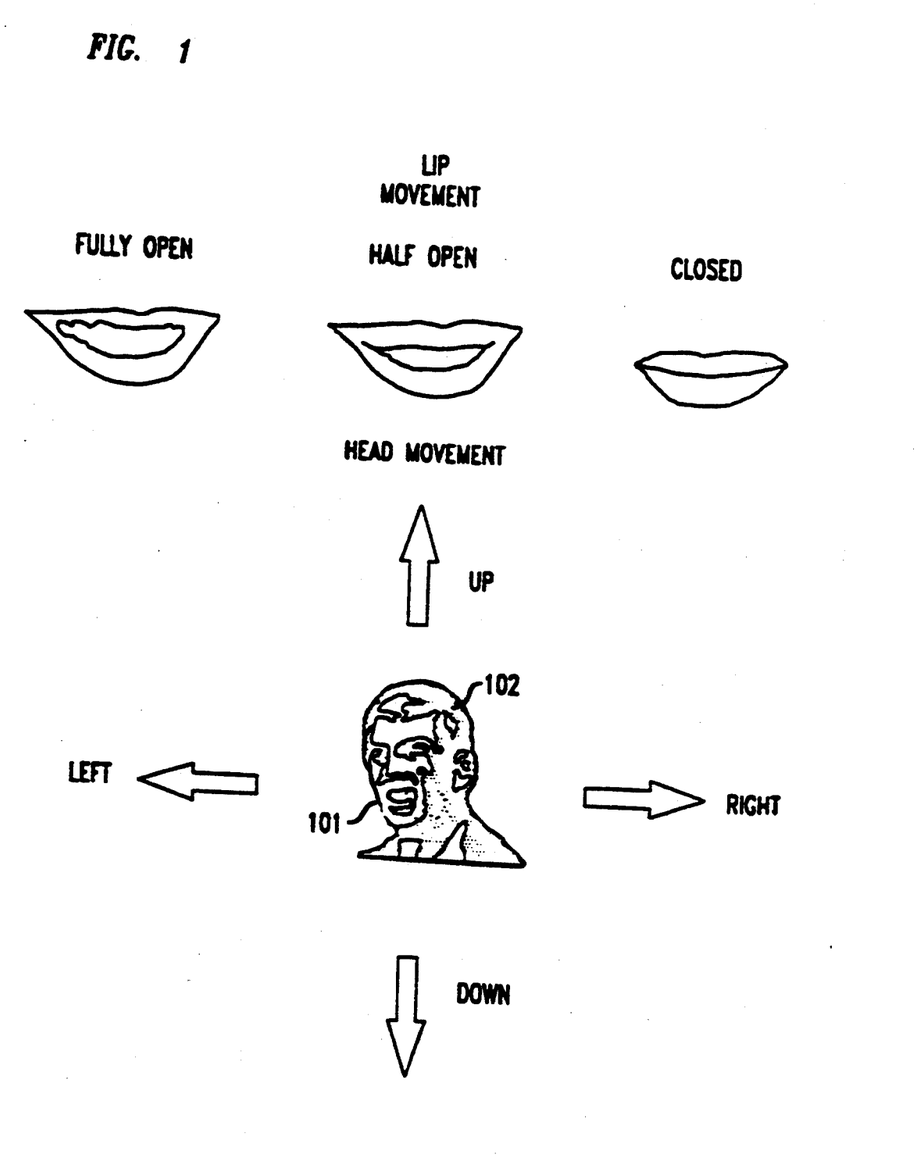
FIG. 1 is a pictorial schematic of a human face and with views of certain of its animated vocal features that typically have frequent movement during the course of a conversation.

A typical facial image, in FIG. 1, of a telephone caller, such as may be transmitted over a communication signal, is shown as a frontal view. This view shows a planar view of the caller including the lips 101 and a defined peripheral boundary 102 of the face. In the preferred system of the invention the full facial image of the caller is transmitted over the telecommunication voice channel at the beginning of a call transmission. The majority of the facial features are substantially invariant for the duration of the call. In contrast specific features such as the lips are constantly changing. The position of the facial periphery also tends to change slowly throughout the duration of the call and hence the position of the lips must change, to maintain its relative position within the periphery.

The most frequent movements shown in the FIG. 1 are the lips. The lips in the received image may be replaced by a stylized image of the lips which are animated to replicate the actual movement of the caller's lips.

Figure 2:
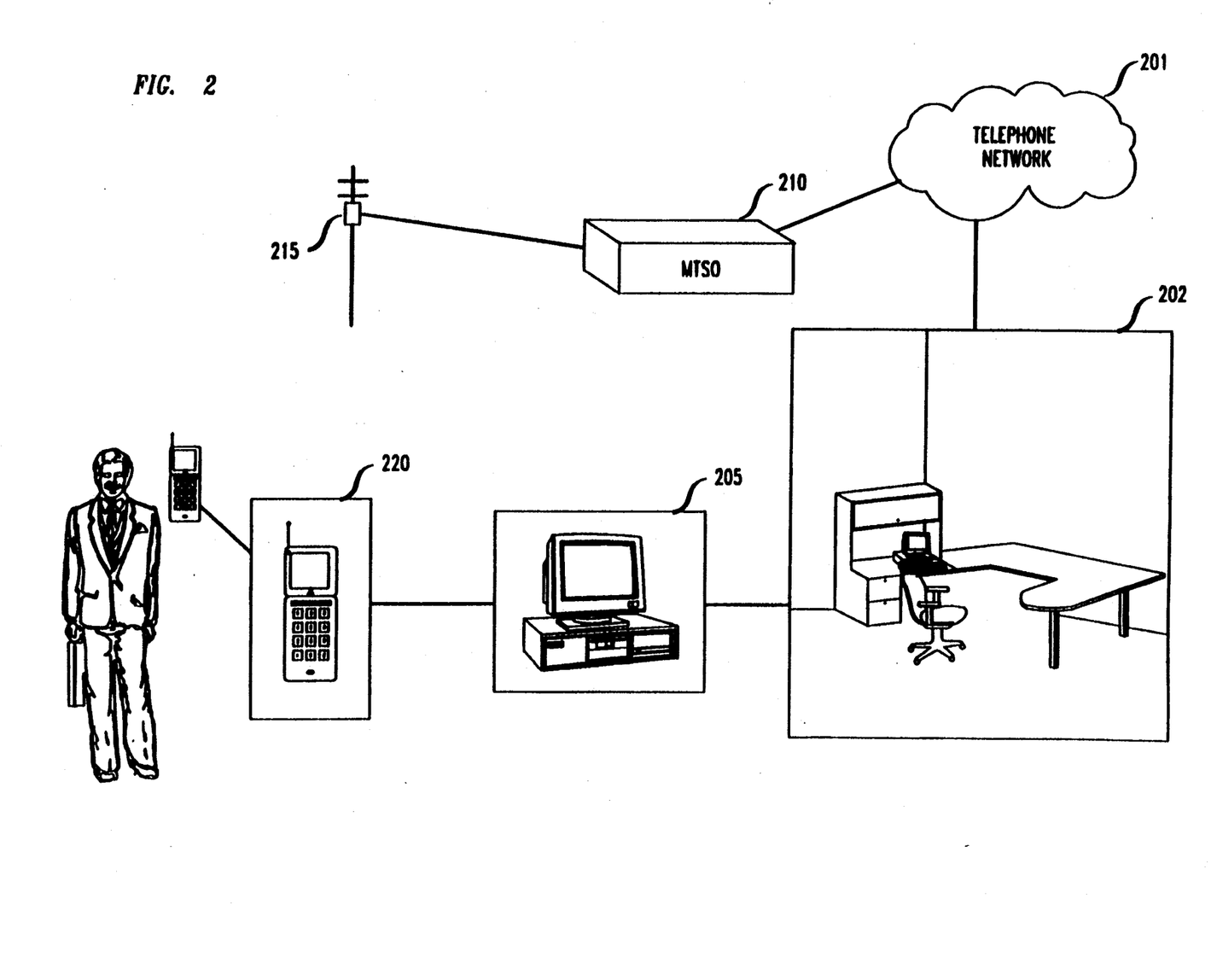
FIG. 2 is a pictorial schematic of a telephone system in which a mobile communicator is coupled through a wireless and land-line telephone network to a fixed location subscriber communicator.

A typical telephone system in which an image of a caller may be transmitted over a voice communication channel is shown in the schematic of FIG. 2. The network includes a land-line telephone network 201 which is connected by a telephone cable to a subscriber residence 202 including a telecommunications imaging device 205, shown in the inset box, capable of recording images of a user of the telecommunications device. The land telephone network is also connected to a mobile switching center (MTSO) 210 which in turn is connected to a cell site 215. A mobile subscriber with a handset 220, illustrated in the inset, is shown in radio communication with the cell site 215. The enlarged view of the handset, shown in the inset, displays a handset capable of recording and transmitting an image and with a small screen included for the receipt of images. The subscriber station in the residence, also shown in enlarged form in the inset, has the capability of sending and receiving images.

Figure 3:
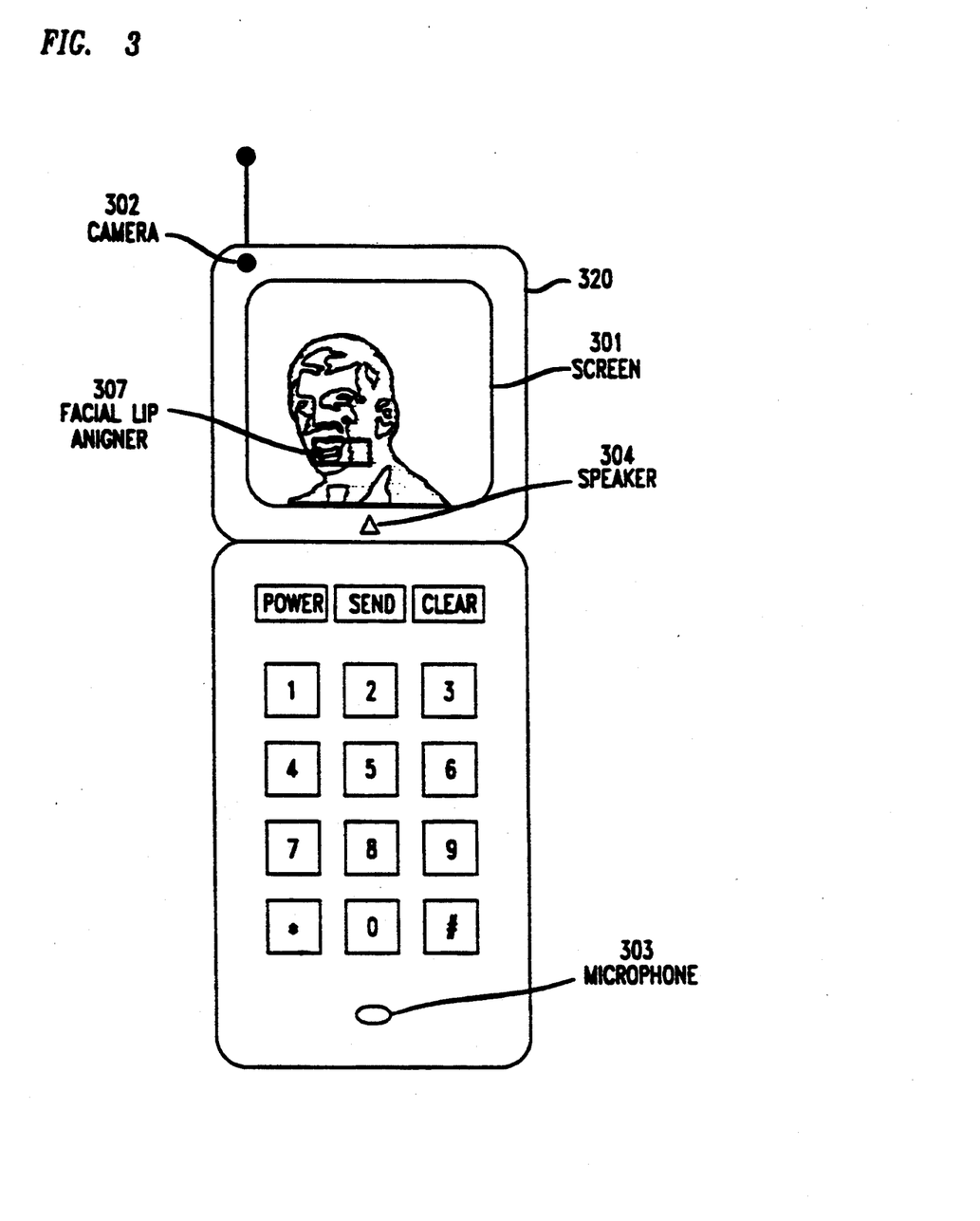
FIG. 3 is a pictorial schematic of a mobile communicator suitable for use in the telephone system of FIG. 1.

The handset 320, as shown in the FIG. 3, has a screen 301 for displaying images, and a camera receiving mechanism 302 for permitting the recording of an image of the user of the handset. A microphone 303 receives voice transmissions and a speaker 304 provides the output of the received voice messages. The screen 301 has a special screen area 307 devoted to displaying the lips of the facial image of the caller calling the handset. This area includes a special controllable image which is controlled to reproduce or animate the lip motion in response to the received speech signal of the caller.

Figure 4:
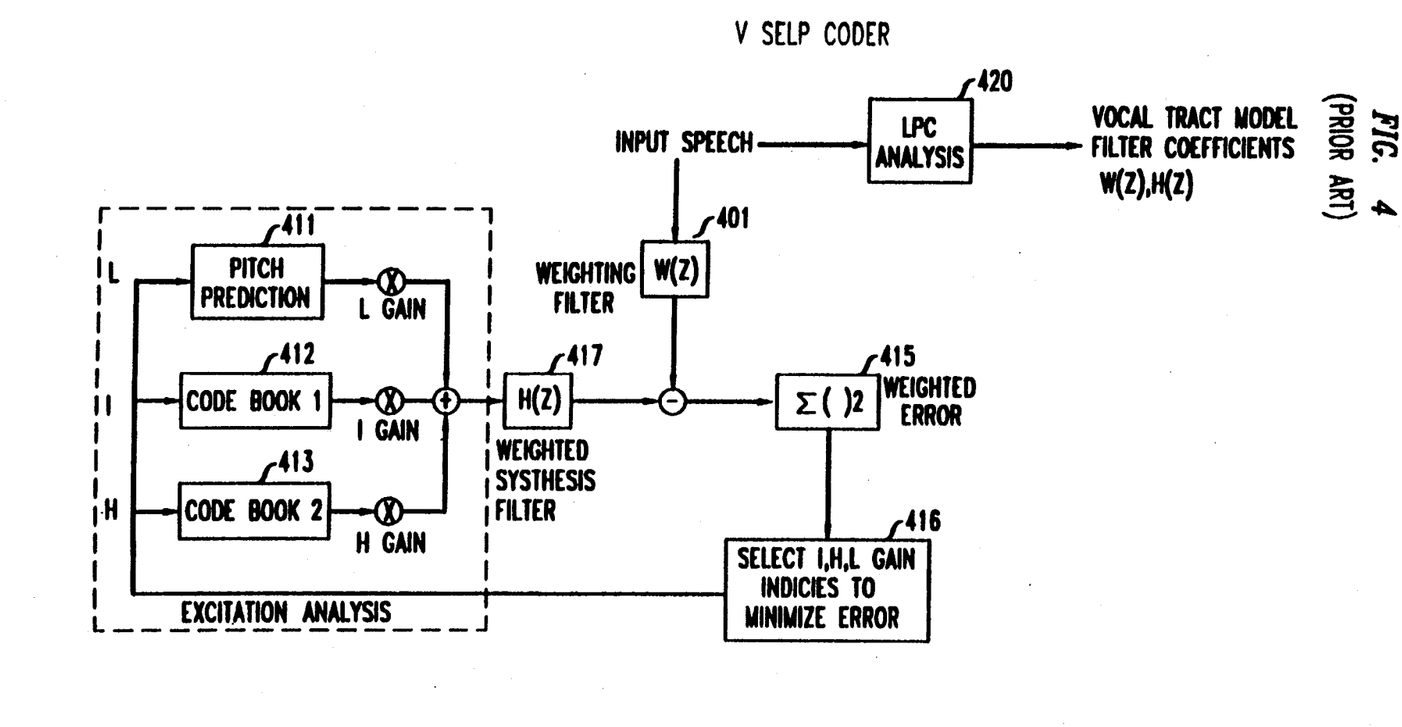
FIG. 4 is a block diagram of a VSELP coder circuit which is used in the mobile communicator of FIG. 1 and the fixed location subscriber communicator in FIG. 1.

The mechanism and circuitry of the speech coding circuitry is shown in the FIG. 4. The VSELP (Vector Sum Excited Linear Prediction) coding technique utilized in the illustrative embodiment is generally well known to those skilled in the art and need not be discussed in detail. The system providing animation of the lips of the image of the caller is operates from the output of this VSELP coder. A VSELP speech coder functional processor, shown in the FIG. 4, generates the desired vocal tract model filter coefficients used for controlling the lip animation.

Digital voice coders such as VSELP capture speech frames and determine vocal tract filter coefficients and associated excitation. This information is quantized and converted into codebook indices which are transmitted to the decoder. The encoder uses an analysis-by-synthesis technique to determine the optimal indices. First, the incoming speech frame is analyzed to determine the overall frame energy and filter coefficients, which are quantized according to the codebook 420. The input speech is then weighted by circuit 401 using the filter coefficients to determine the weighted speech vector. the output of the synthesis filter 417 is compared to the weighted speech and and an error metric is generated by the circuit 415. The excitation encoding process in circuit 416 involves the selection of four indices I, H, L and gain selected so that any error is minimized. The excitation itself is modeled as the vector sum of the outputs of three different codebooks 411, 412 and 413. The pitch prediction or lag codebook 411 accounts for the primarily periodic elements of the excitation. The codebook 412 and the code book 413 provide vectors derived predefined fixed values in the codebooks which primarily represent non-periodic elements of the excitation. The three excitation vectors are individually weighted using values chosen from a gain codebook, and are summed to form the combined excitation which is then passed to the synthesis filter 417 for comparison with the weighted speech.

Figure 5:
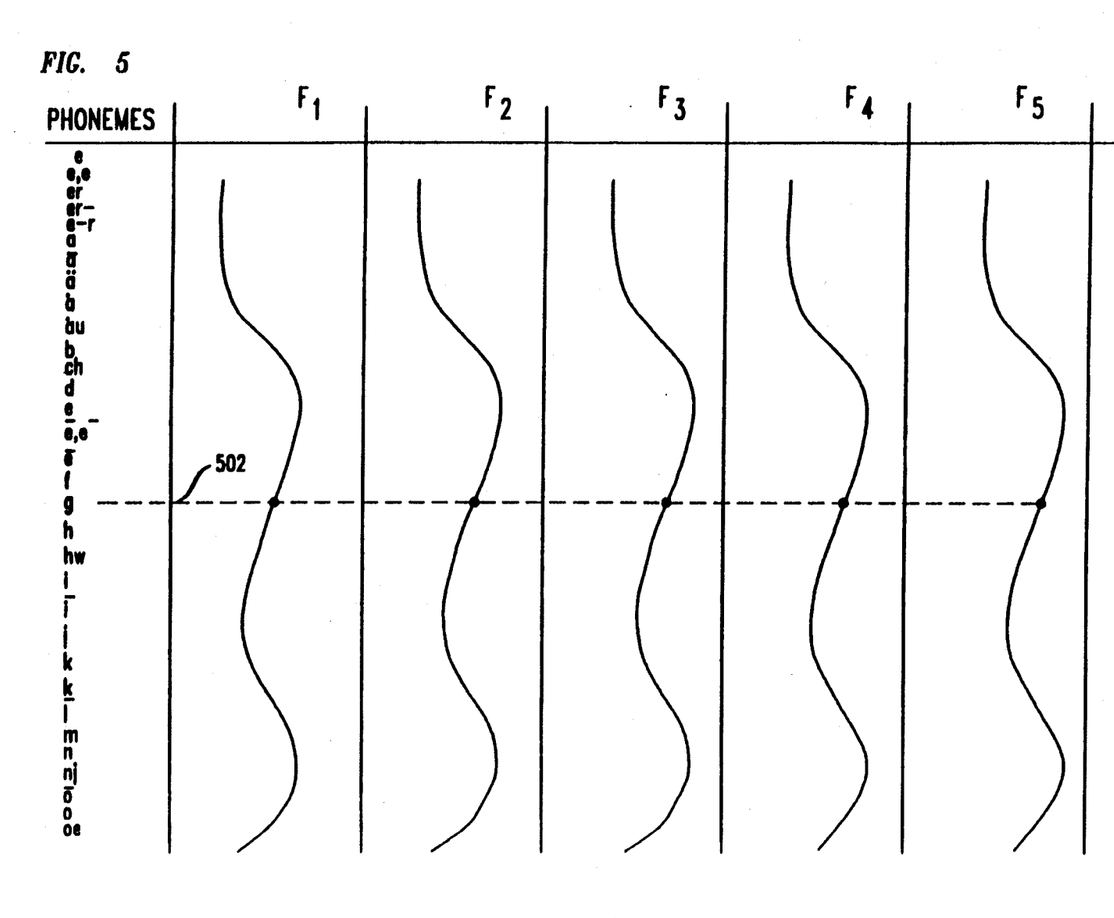
FIGS. 5 and 6 show phonic conversion tables disclosing wave forms of formant frequencies correlated with related phonemes.
Figure 6:
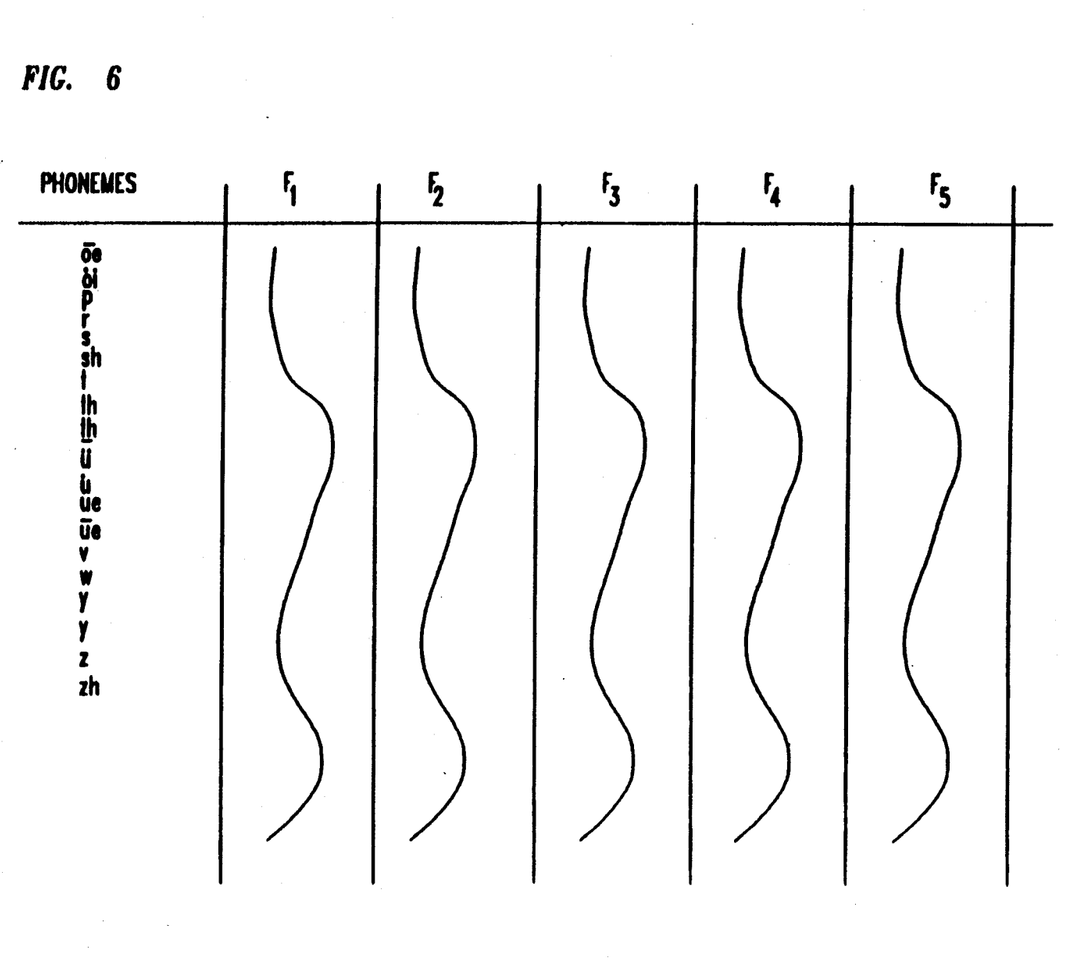
Figure 7:
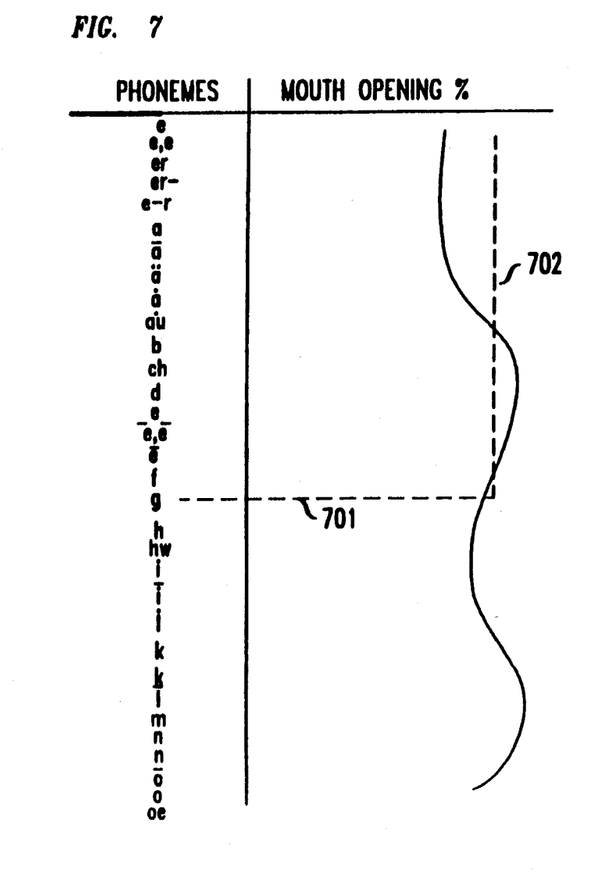
FIGS. 7 and 8 show mouth position tables relating mouth positions with related phonemes.
Figure 8:
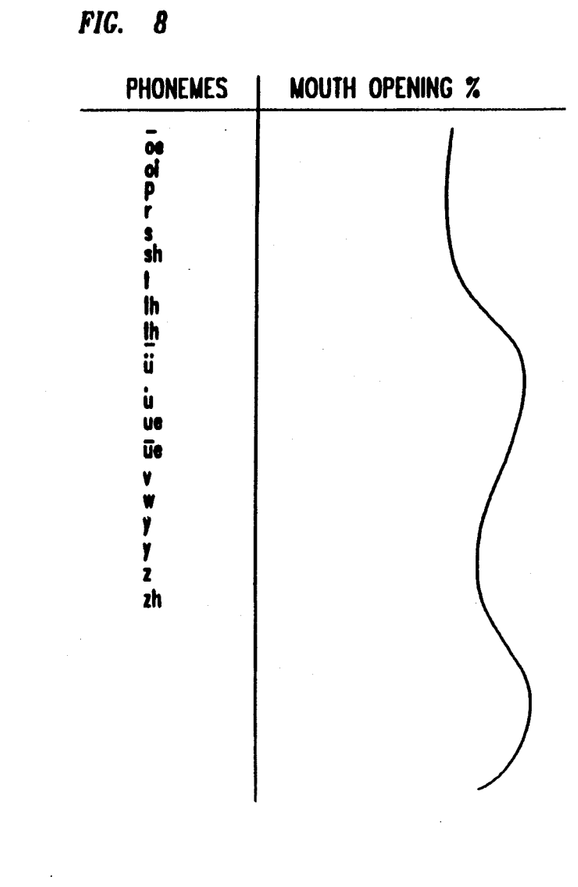

The input speech is also applied to the linear predictive coder processor 420, which provides filter coefficients which are representative of the resonant peaks or formants of the input speech. The LPC filter coefficients are :related to the lip movements producing the speech. These filter coefficients and indices are transmitted as the total voice speech signal to a telecommunications receiver. The receiver includes a phonic code table which equates these filter coefficients to synthesized mouth movements which are used to control the stylized image presented in the lip area of the caller as displayed at the receiver. An imaging system utilizes the tabular output of the phonic code table to activate mouth movements of the stylized mouth image. The relations between the filter coefficients may be seen in the phonic conversion table of FIG. 5 and 6 which equate formant frequencies to specific phonemes. A phoneme is selected by determining a specific frequency of one of the formant frequencies and finding the related phoneme. The dotted line 501, in FIG. 5, shows how a specific formant frequency of one of the formants 510 through 5 14 may be used to determine the related phoneme "g". As shown different parameters of speech may have different formant curves. Determination of these phonemes allow the translation to mouth opening parameters as shown in the mouth position table of FIGS. 7 and 8 equating phonemes to mouth openings. The dotted lines 701 and 702 show how the phoneme g is converted into a coordinate point representing a percent of mouth or lip opening.

Figure 9:
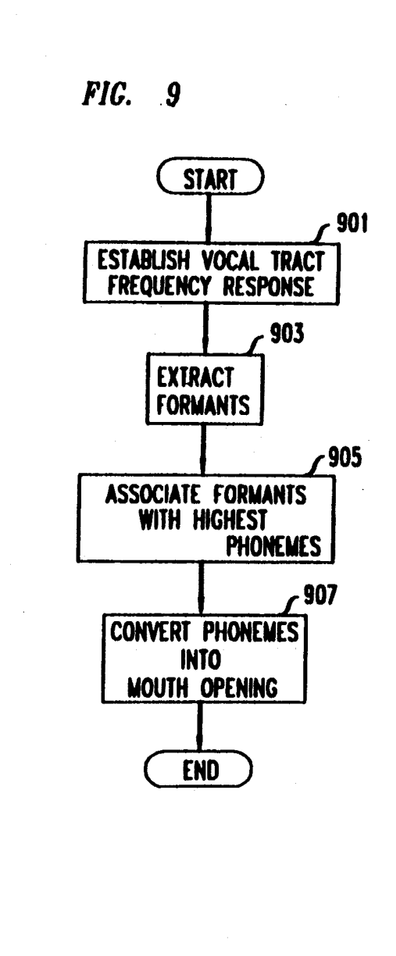
FIG. 9 is a graph of vocal tract model filter coefficients.

The conversion is performed in response to a data processing program such as shown in the flow diagram of FIG. 9. The input speech is used to establish a vocal tract frequency response in the instruction block 901. This response is used to allow extraction of formants in the instruction block 903. A statistical method or evaluation is used to associate the formants specified as filter coefficients with phonemes through use of the phonic conversion table. The highest likelihood phonemes are converted into stylized mouth animation by a image control mechanism in response to the mouth position table.

Figure 10:
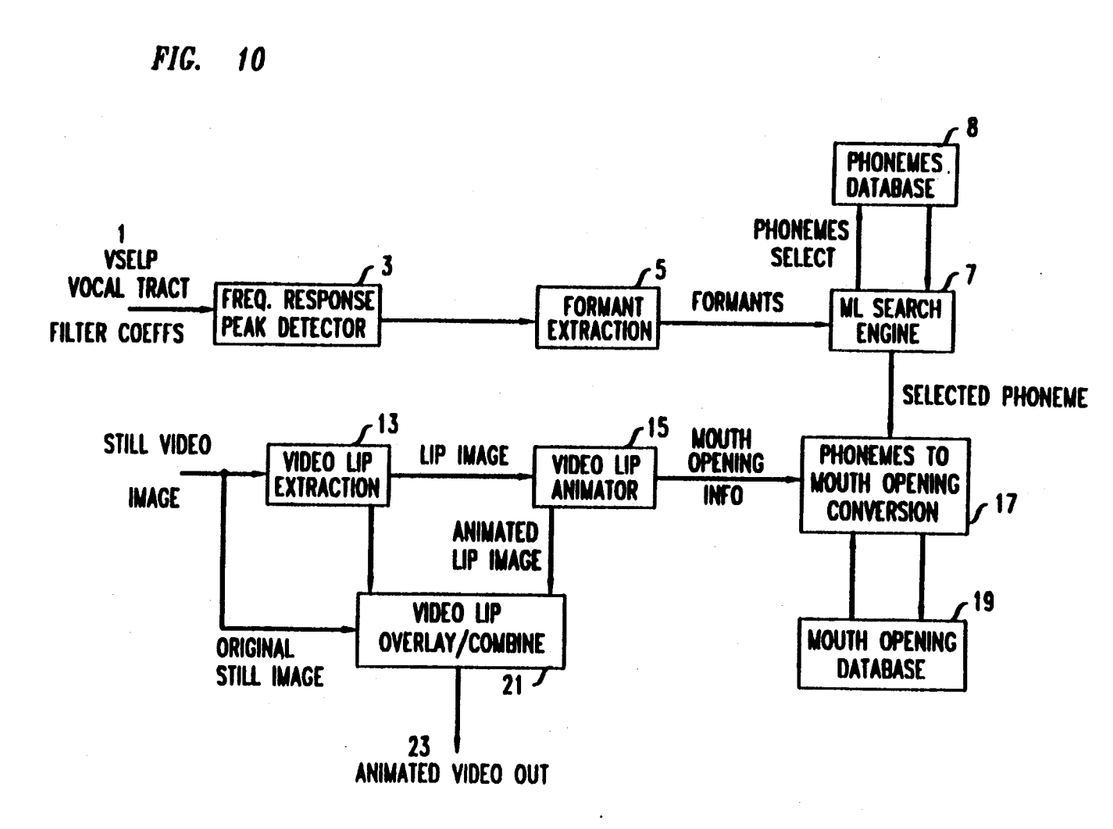
FIG. 10 is a block diagram of circuitry responsive to the VSELP coder of FIG. 4 to utilize the related phonemes and formant frequencies to generate a controlled lip image that is animated in response to the phonemes and formants.

The specific circuitry to control the animated stylized image is shown in the FIG. 10. The filter coefficient output of the VSELP is applied to the terminal 1 and input to a frequency response and peak detector circuit 3. This circuit detects the peak values of vocal frequencies. The subsequent formant extraction component 5 is connected to the output of peak detector circuit 3 to extract the formants of the characterized speech. The formants are applied to a search engine 7 which interacts with a phoneme database 8 which includes information in database form, such as shown graphically in the FIGS. 5 through 7, and which correlates formants to phonemes. The search engine 7 interacts with the data base 8 to select the best representative phoneme and applies this data to the phoneme to mouth opening converter 17. Converter 17 is connected and responsive to mouth opening database 19 which encodes the data graphically shown in the FIGS. 7 and 8.

A still video image of the caller is applied on lead 11 to the video-lip-extractor 13 which applies the extracted lip image to a video lip animator circuit 15. The mouth opening converter 17 also supplies an output to the video-lip-animator 15. The output control signal of the video-lip-animator is applied to the video lip overlay circuit 21 which overlays the animated lips over the input lip image received on lead 11. The animated lips, combined with the overall facial image are applied via lead 23 to the the video output of the communication receiver.

We claim:

1. A method of providing voice and image communications over a wireless communication channel, comprising the steps of:
   establishing a wireless communication channel between a first and second wireless communication device, each first and second wireless communication device having a voice and an image communication capability;
   generating a still image at the first wireless communication device and transmitting the still image to the second wireless communication device over the wireless communication channel;
   enunciating a voice message at the first wireless communication device, translating the voice message into a digitally encoded VSELP (Vector Sum Excited Linear Prediction) format and transmitting the encoded voice message to the second wireless communication device over the wireless communication channel;
   replacing an active portion of the received still image related to voice enunciation at the second wireless communication device by an idealized image illustrative of that active portion of the still image;
   animating the idealized image in response to code elements of the encoded format of the voice message by determining vocal tract filter coefficients representative of formants of the voice message
   equating the filter coefficients to synthesized mouth movements by using a phonic code table, and;
   using an output of the phonic table to activate and animate the idealized image.

2. A method of transmitting information defining mouth animation of a speaker over a communication channel;
   comprising the steps of:
   digitally VSELP (Vector Sum Excited Linear Prediction) encoding a voice message of the speaker to generate a vocal tract frequency response of speech of the speaker;
   extracting vocal tract formants from the vocal tract frequency response;
   associating the formants with phonemes by means of a phonic translation table equating formant frequencies to phonemes;
   converting the phonemes to parameters representing mouth animation of the speaker;
   generating an image of a mouth with mouth animation by translating the parameters representing mouth animation of the speaker to mouth openings.

3. A method of transmitting information defining mouth animation of a speaker over a communication channel as claimed in claim 2; wherein
   the step of generating an image is performed at a receiver which receives coded messages representing the speech of the speaker.

4. A method of transmitting information defining mouth animation of a speaker over a communication channel as claimed in claim 3; wherein
   the step of converting includes the use of maximum likelihood techniques to associate formants with phonemes.

5. In a wireless communication system in which a still pictorial image of a caller is transmitted over a communication channel at the beginning of a voice communication;
   a receiver including;
   image display means :for displaying the still pictorial image to a user of the receiver;
   circuitry for effecting lip animation of the still pictorial image, including:
   means for digitally encoding the voice communication in VSELP (Vector Sum Excited Linear Prediction) form means for extracting formants of received speech signals from the VSELP format;
   means for associating phonemes with the formants by means of a phonic translation table equating formant frequencies to phonemes;
   means for converting the phonemes to lip opening states;
   means for animating the lips displayed as part of the still pictorial image in response to the determined lip opening states.

* * * * *